(12) United States Patent
Dodo (10) Patent No.: US 7,987,956 B2
(45) Date of Patent: Aug. 2, 2011

(54) AUTOMATIC TRANSMISSION CONTROL DEVICE AND METHOD OF CONTROLLING AUTOMATIC TRANSMISSION

(75) Inventor: Kohei Dodo, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 519 days.

(21) Appl. No.: 12/205,223

(22) Filed: Sep. 5, 2008

(65) Prior Publication Data

US 2009/0065321 A1 Mar. 12, 2009

(30) Foreign Application Priority Data

Sep. 7, 2007 (JP) ................................ 2007-232798

(51) Int. Cl.
*F16H 61/00* (2006.01)
*F16D 43/284* (2006.01)
*F16D 25/12* (2006.01)

(52) U.S. Cl. .................... 192/3.58; 192/103 F; 475/127; 477/80

(58) Field of Classification Search .................... None
See application file for complete search history.

(56) References Cited

U.S. PATENT DOCUMENTS

| 4,719,998 A * | 1/1988 | Hiramatsu et al. ......... 192/103 F |
| 4,997,071 A * | 3/1991 | Villata et al. ............... 192/103 F |
| 7,010,405 B2 * | 3/2006 | Furuichi et al. ................. 477/80 |

FOREIGN PATENT DOCUMENTS

| JP | 05-240344 A | 9/1993 |
| JP | 2003-240068 A | 8/2003 |
| JP | 2005-265063 A | 9/2005 |

OTHER PUBLICATIONS

Machine translation of JP 2005-265063 A, pub date: Sep. 5, 2005, Jatco Ltd.*

* cited by examiner

*Primary Examiner* — Rodney H Bonck
(74) *Attorney, Agent, or Firm* — Sughrue Mion, PLLC (57) ABSTRACT

A transmission ECU calculates a differential rotation, which is the rotational speed difference between a friction plate and a separator plate, when it is determined that a second brake is not engaged. If it is determined that the differential rotation is equal to or above a predetermined value, the transmission ECU narrows the pack clearance of the second brake. If it is determined that the differential rotation is less than the predetermined value, the transmission ECU widens the pack clearance of the second brake.

7 Claims, 7 Drawing Sheets

|     | C1 | C2 | B1 | B2 | B3 | F |
|-----|----|----|----|----|----|----|
| 1st | ○ |    |    | ● |    | ○ |
| 2nd | ○ |    | ○ |    |    |    |
| 3rd | ○ |    |    |    | ○ |    |
| 4th | ○ | ○ |    |    |    |    |
| 5th |    | ○ |    |    | ○ |    |
| 6th |    | ○ | ○ |    |    |    |
| Rev |    |    |    | ○ | ○ |    |

○ ENGAGEMENT
● ENGAGES ONLY DURING ENGINE BRAKE

AUTOMATIC TRANSMISSION CONTROL DEVICE AND METHOD OF CONTROLLING AUTOMATIC TRANSMISSION

INCORPORATION BY REFERENCE

The disclosure of Japanese Patent Application No. 2007-232798 filed on Sep. 7, 2007 including the specification, drawings and abstract is incorporated herein by reference in its entirety.

BACKGROUND OF THE INVENTION

1. Field of the Invention

The present invention relates to a control device for an automatic transmission and a method of controlling the automatic transmission. Specifically, the present invention relates to a control device for an automatic transmission and a method of controlling the automatic transmission that optimally adjust the clearance between friction engagement elements, when the friction engagement elements are disengaged.

2. Description of the Related Art

Conventionally, in automatic transmissions that includes a torque converter and a planetary gear mechanism, a friction engagement element of multiple-plate clutch type is often used as a clutch or a brake provided to a planetary gear mechanism.

Automatic transmissions that enable a multi-speed gearshift of 6-speed forward drive gears with clutches have been described (for example, refer to Japanese Patent Application Publication No. 2003-240068 (JP-A-2003-240068)). Among the friction engagement elements of such automatic transmissions, a second brake may be engaged by moving a piston to the axial direction, with the aid of hydraulic pressure, to press the clutch plates against each other. The clutch plates are constituted by a rotating friction plate that has a friction member attached on both surfaces and by a stationary friction plate that is fixed to a case. The second brake may be disengaged through the urging force of a return spring.

The second brake, which establishes a first gear step, includes parallel one-way clutches. Thus, the second brake is not engaged when the vehicle starts moving, but the second brake is engaged when engine brake is applied.

However, in the conventional automatic transmission described in JP-A-2003-240068, for example, when the vehicle is moving at high speed, the rotating friction plate runs idle at high speed in relation to the stationary friction plate, according to the speed of the vehicle.

When the rotating friction plate rotates at high speed and the clearance between the friction member of the rotating friction plate and the stationary friction plate, that is the pack clearance, is relatively large, the rotating friction plate moves intensely in relation to the stationary side friction plate, and the friction member of the rotating friction plate comes in contact with the stationary friction plate. Accordingly, friction force increases, and drag torque of the clutch plate increases.

As a result, the oil temperature in the automatic transmission increases and may have a tendency to easily overheat.

However, it is possible to reduce pack clearance in order to prevent intense motion of the rotating friction plate in a high-speed driving range.

However, if the rotating friction plate rotates at a rotational speed in a normal-speed driving range when the clearance is reduced, oil tends to be pooled between the friction member and the stationary friction plate, compared to a case where the rotating friction plate rotates at the rotational speed in a high-speed driving range. Therefore, the shear force of oil increases, and accordingly drag torque of the clutch plate is increased.

In addition, it also causes a problem that, when the drag torque of the clutch plate increases, power loss increases and accordingly the fuel economy of the vehicle decreases.

SUMMARY OF THE INVENTION

The present invention provides a control device for an automatic transmission and a method of controlling the automatic transmission that improves the durability of the automatic transmission and the fuel economy of the vehicle by decreasing the drag torque of the clutch plate regardless of whether the vehicle is driven in a high-speed driving range or in a normal-speed driving range.

A control device for an automatic transmission according to a first aspect of the present invention, in which the automatic transmission includes plural pairs of friction engagement elements constituted by multiple-plate clutch plates and a piston that actuates the clutch plates; the control device controls the engagement and disengagement of the respective friction engagement elements, and forms a plurality of gear steps, includes: a rotational speed difference detection device that detects a relative rotational speed difference in the clutch plates when the clutch plates are disengaged; and a hydraulic pressure control device that controls working pressure of the piston to adjust a clearance between the disengaged clutch plates in accordance with the detected rotational speed difference.

By this constitution, a clearance between the disengaged clutch plates can be adjusted in accordance with the detected rotational speed difference detected by the rotational speed difference detection device. Thus, drag torque of the clutch plate can be decreased regardless of whether the vehicle drives in a high-speed driving range or in a normal-speed driving range. Therefore, durability of the automatic transmission and a fuel economy of the vehicle can be improved.

In the first aspect, the hydraulic pressure control device may decrease the clearance between the disengaged clutch plates if the detected rotational speed difference is large.

By this constitution, intense motion of the clutch plate can be decreased when the vehicle drives in the high-speed range. Thus, drag torque of the clutch plate can be decreased. As a result, durability of the automatic transmission and a fuel economy of the vehicle can be improved at the same time.

In the first aspect, the hydraulic pressure control device may adjust the clearance between the disengaged clutch plates based on a gear change state of the automatic transmission when the friction engagement elements are being engaged.

By this constitution, a clearance between the disengaged clutch plates can be adjusted based on a gear change state of the automatic transmission. Thus, overtime-change of each part of the friction engagement elements can be less caused, and an optimum clearance can be maintained.

In the first aspect, the rotational speed difference detection device may detect the relative rotational speed difference in the disengaged clutch plates based on a vehicle speed and a gear step.

By this constitution, a relative rotational speed difference in the disengaged clutch plates is detected based on a vehicle speed and a gear step. Thus, a rotational speed difference can be detected precisely.

A second aspect of the present invention is a method of controlling an automatic transmission, wherein the automatic transmission includes plural pairs of friction engagement elements constituted by multiple-plate clutch plates and a piston that actuates the clutch plates, the piston is controlled to engage and disengage of the respective friction engagement elements to form a plurality of gear steps, includes: detecting a relative rotational speed difference in the clutch plates when disengaged; and controlling working pressure of the piston to adjust a clearance between the disengaged clutch plates.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
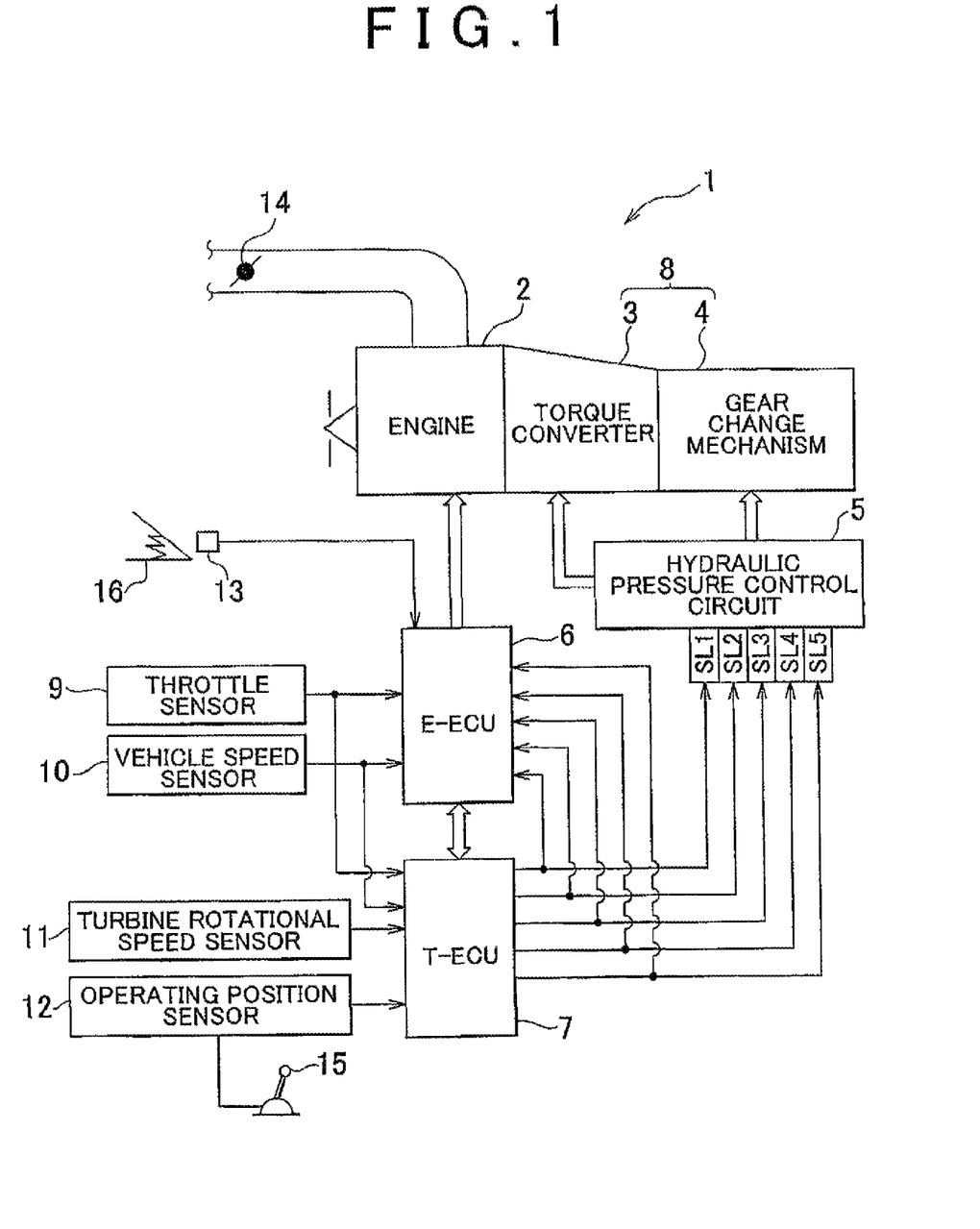
FIG. 1 is a general constitution diagram schematically illustrating a vehicle provided with a control device for an automatic transmission according to an embodiment of the present invention.

Embodiments of the present invention will hereinafter be described with reference to the drawings. The constitution is first described. FIG. 1 is a general constitution diagram schematically illustrating a vehicle equipped with an automatic transmission control device according to an embodiment of the present invention. In this embodiment, the automatic transmission control device according to the present invention will be described in the context of an FF (Front engine Front drive) vehicle.

As shown in FIG. 1, a vehicle 1 includes: an engine 2; a torque converter 3; a transmission mechanism 4 that has a forward clutch; a hydraulic pressure control circuit 5 that controls the torque converter 3 and the transmission mechanism 4 by hydraulic pressure; an engine ECU (Electronic Control Unit) 6 that controls the engine 2 as a power source; and a transmission ECU 7 that controls the hydraulic pressure control circuit 5.

The engine 2 may be an internal combustion engine in which a mixture of air and fuel sprayed from an injector (not shown) is burned in the combustion chamber in a cylinder. The piston in the cylinder is pushed down by combustion energy to rotate a crankshaft (not shown). However, an external combustion engine may be used instead of an internal combustion engine. Furthermore, a rotating electric device or the like may also be used in place of the engine 2.

The torque converter 3 transmits power of the engine 2 with increased torque from the engine 2 to the transmission mechanism 4. The torque converter 3 has: a pump impeller (hereinafter referred to simply as "impeller") connected to an output shaft of the engine 2; a turbine runner (hereinafter referred to simply as "turbine") connected to an input shaft of the transmission mechanism 4; and a stator in which rotation to one direction is prohibited by the one-way clutch. The impeller and the turbine transmit power through a fluid.

The torque converter 3 and the transmission mechanism 4 constitute the automatic transmission 8. The automatic transmission 8 changes the rotational speed of the crankshaft to a desired rotational speed by establishing a desired gear step. The transmission mechanism 4 is described in detail later. The hydraulic pressure control circuit 5 includes linear solenoid valves SL1 to SL5.

Figure 2:
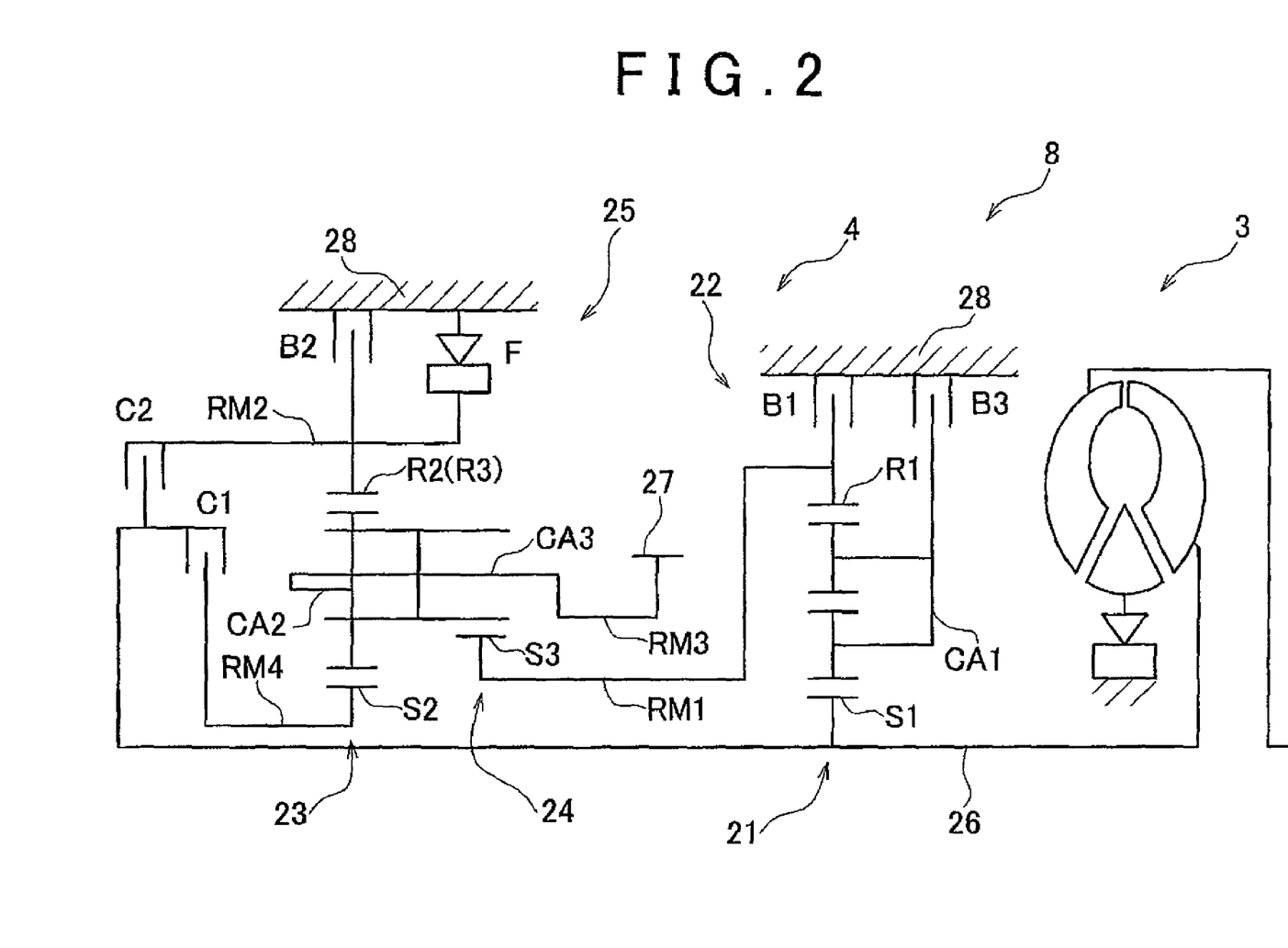
FIG. 2 is a schematic diagram illustrating an automatic transmission according to an embodiment of the present invention.

FIG. 2 is a schematic diagram of an automatic transmission according to an embodiment of the present invention.

As shown in FIG. 2, the transmission mechanism 4 of the automatic transmission 8 includes: a first transmission unit 22 that includes mainly a double pinion type of a first planetary gear train 21; a second transmission unit 25 that includes mainly a single pinion type of second planetary gear train 23 and a double pinion type of third planetary gear train 24, on the same shaft line. By this constitution, the transmission mechanism 4 changes a rotational speed of the input shaft 26 and outputs rotation from the output gear 27. The input shaft 26 is a turbine shaft of the torque converter 3 that is driven for rotation by the engine 2. The output gear 27 drives the right and left drive wheels for rotation through a differential gear. The transmission mechanism 4 is generally symmetrical with respect to the centerline (input shaft line), and thus, the lower half of the transmission mechanism 4 is not shown in FIG. 2.

The first planetary gear train 21 that constitutes the first transmission unit 22 includes three rotating elements, which are a sun gear S1, a carrier CA1, and a ring gear R1. In the first planetary gear unit 21, the sun gear S1 is driven to rotate while connected to the input shaft 26. At the same time, the carrier CA1 is unrotatably fixed to the case 28 through the third brake B3. Accordingly, the ring gear R1 outputs rotation in a reduced speed in relation to the input shaft 26.

The second planetary gear train 23 and the third planetary gear train 24, which constitute the second transmission 25, are partly connected to each other so as to constitute four rotating elements RM1 to RM4. Specifically, the first rotating element RM1 is constituted by the sun gear S3 of the third planetary gear train 24. The second rotating element RM2 is constituted by the ring gear R2 of the second planetary gear train 23 and by the ring gear R3 of the third planetary gear train 24, which are connected to each other. The third rotating element RM3 is constituted by the carrier CA2 of the second planetary gear train 23 and by the carrier CA3 of the third planetary gear train 24, which are connected to each other. The fourth rotating element RM4 is constituted by the sun gear S2 of the second planetary gear train.

In the second planetary gear train 23 and the third planetary gear train 24, the carriers CA2 and CA3 are constituted by a common member. Likewise, the ring gears R2 and R3 are constituted by a common member. A pinion gear of the second planetary gear train 23 is a Ravigneaux type of planetary gear line that also serves as a second pinion gear of the third planetary gear train 24.

Rotation of the first rotating element RM1 (sun gear S3) is stopped by the first brake B1 by selectively connected to the case 28. Rotation of the second rotating element RM2 (ring gears R2 and R3) is stopped by the second brake B2 by selectively connected to the case 28. The fourth rotating element RM4 (sun gear S2) is selectively connected to the input shaft 26 through the first clutch C1. The second rotating element RM2 (ring gears R2 and R3) is selectively connected to the input shaft 26 through the second clutch C2. The first rotating element RM1 (sun gear S3) is integrally connected to the ring gear R1 of the first planetary gear train 21. The third rotating element RM3 (carriers CA2 and CA3) are integrally connected to the output gear 27 to output rotation. The first brake B1, the second brake B2, the third brake B3, and the first clutch C1, and the second clutch C2 are all multiple-plate hydraulic friction engagement elements that are engaged by working pressure. The one-way clutch F that inhibits reverse rotation while allowing forward rotation (i.e., rotation in the same direction with the input shaft 26) of the second rotating element RM2 is disposed parallel to the second brake B2 between the second rotating element RM2 and the case 28.

When the first clutch C1 and the second brake B2 are engaged, and the fourth rotating element RM4 is rotated integrally with the input shaft 26, and rotation of the second rotating element RM2 is stopped the first gear step, indicated by "1st", is established and the third rotating element RM3, which is connected to the output gear 27, is rotated at the rotational speed of the first gear step, which has the highest gear ratio.

When the first clutch C1 and the first brake B1 are engaged, and the fourth rotating element RM4 is rotated integrally with the input shaft 26 and rotation of the first rotating element RM1 is stopped, the second gear step, indicated by "2nd", is established. The third rotating element RM3 is then rotated at the rotational speed of the second gear step, which has a lower gear ratio than the first gear step.

When the first clutch C1 and the third brake B3 are engaged, and the fourth rotating element RM4 is rotated integrally with the input shaft 26 and rotation of the first rotating element RM1 is reduced through the first transmission 22, the third gear step, indicated by "3rd", is established and the third rotating element RM3 is thereby rotated at the rotational speed of the third gear step, which has a smaller gear ratio than the second gear step.

When the first clutch C1 and the second clutch C2 are engaged and the second transmission unit 25 is rotated integrally with the input shaft 26 the fourth gear step, indicated by "4th", is established. Thus, the third rotating element RM3 is rotated at the same rotational speed as the input shaft 26. Thus, fourth gear step "4th" has a gear ratio of 1, which is smaller than the gear ratio of third gear step.

When the second clutch C2 and the third brake B3 are engaged, and the second rotating element RM2 is rotated integrally with the input shaft 26 and rotation of the first rotating element RM1 is reduced through the first transmission unit 22 the fifth gear step, indicated by "5th", is established. Accordingly, the third rotating element RM3 is rotated at the rotational speed of the fifth gear step, which has a smaller gear ratio than the fourth gear step.

When the second clutch C2 and the first brake B1 are engaged, and the second rotating element RM2 is rotated integrally with the input shaft 26 and rotation of the first rotating element RM1 is stopped, the sixth gear step, indicated by "6th", is established. The third rotating element RM3 then rotates at the rotational speed of the sixth gear step, which has a smaller gear ratio than the fifth gear step.

When the second brake B2 and the third brake B3 are engaged, rotation of the second rotating element RM2 is stopped, and rotation of the first rotating element RM1 is reduced through the first transmission unit 22, thereby establishing the reverse gear step, indicated by "Rev". Therefore, rotation of the third rotating element RM3 is reversed at the rotational speed of the reverse-drive gear step.

That is, the automatic transmission 8 establishes a plurality of gear steps by selectively engaging and disengaging the respective friction engagement elements.

Figure 3:
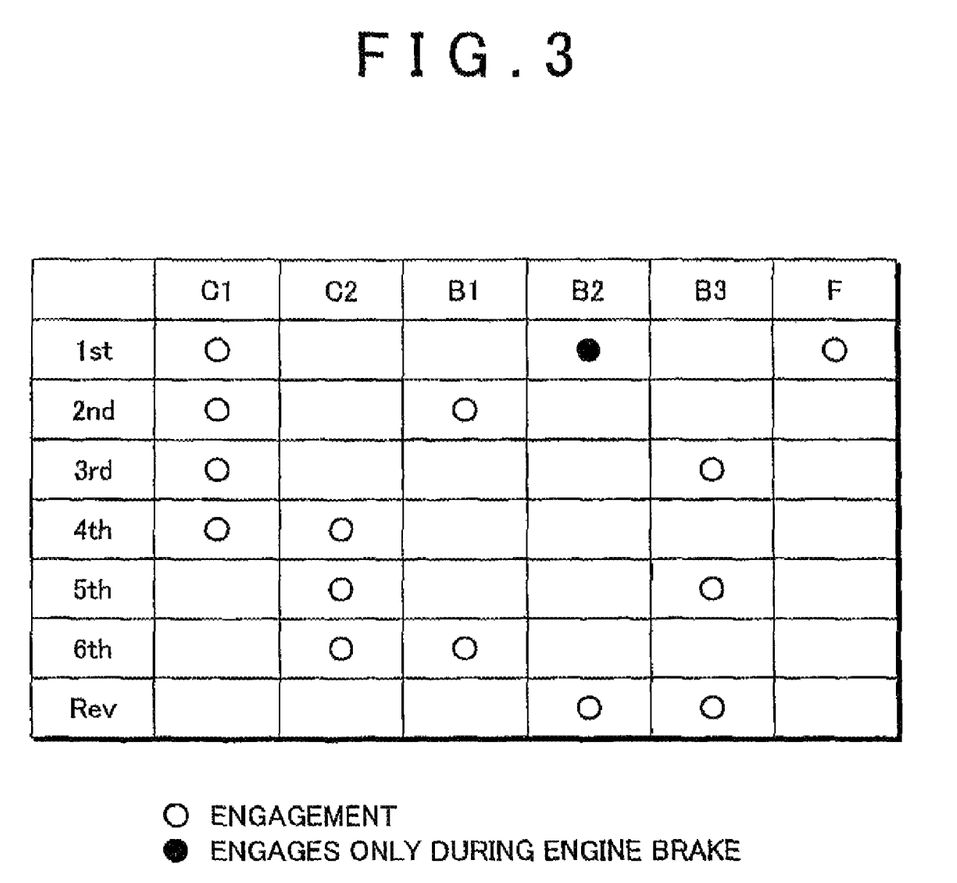
FIG. 3 is diagram illustrating a relationship between a combination of a plurality of hydraulic friction engagement elements and a gear step established thereby in an automatic transmission according to an embodiment of the present invention.

FIG. 3 is a table illustrating a relationship between a combination of operation of a plurality of hydraulic friction engagement elements and a gear step established thereby in the automatic transmission according to an embodiment of the present invention.

In FIG. 3, "○" represents an engagement state, and "●" represents an engagement state of only during engine brake is applied, and the blank represents a disengagement state. The one-way clutch F is provided in parallel to the second brake B2 that establishes the first gear step "1st." Therefore, the second brake B2 is not necessarily engaged at the time of start up (acceleration). The gear ratio of each gear step is appropriately determined by the respective gear ratios ρ1, ρ2, and ρ3 of the first planetary gear train 21, the second planetary gear train 23, and the third planetary gear train 24.

Figure 4:
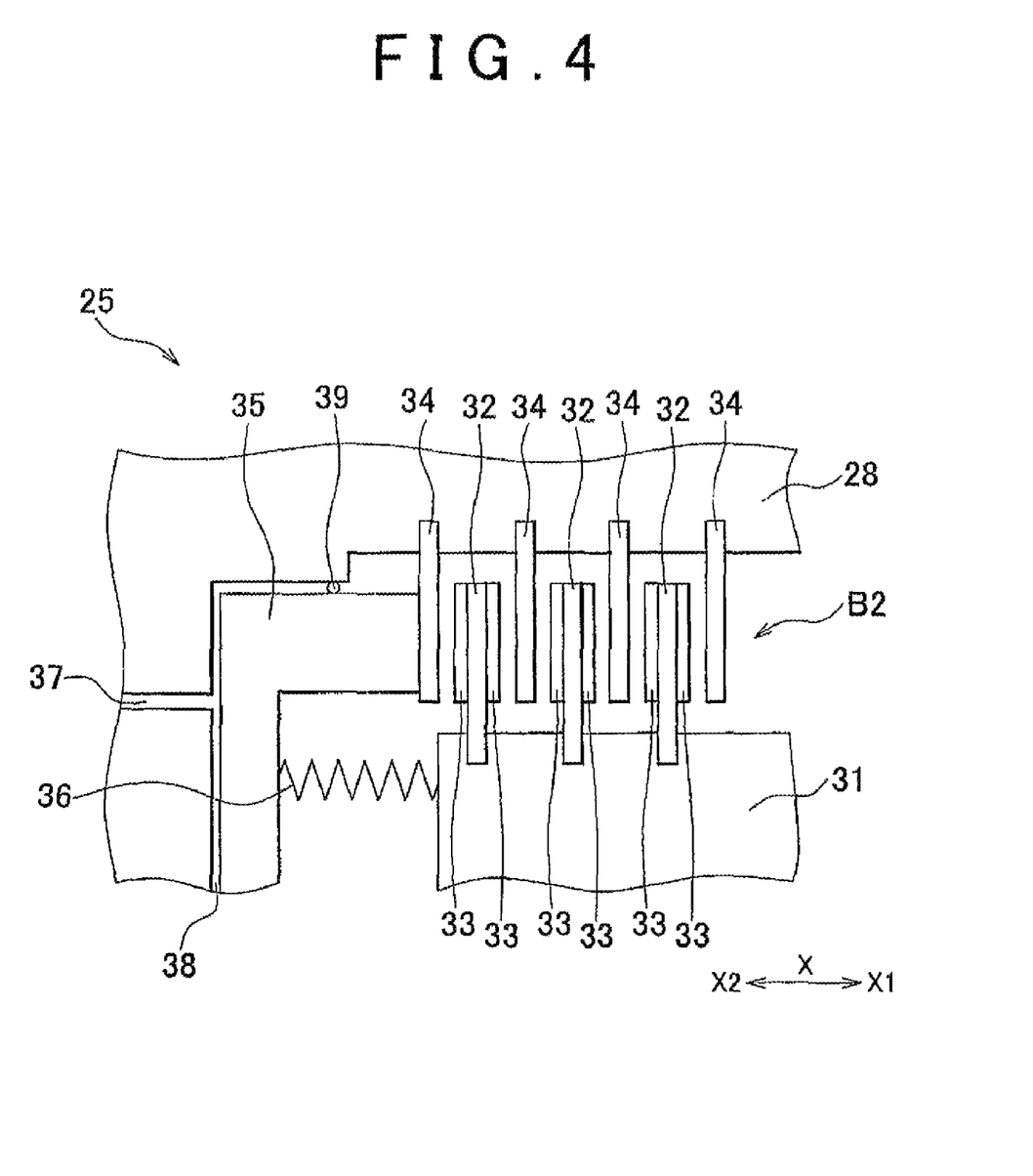
FIG. 4 is a cross-sectional view illustrating a structure of a second brake in a second transmission unit according to an embodiment of the present invention.

FIG. 4 is a cross-sectional view illustrating a structure of the second brake in the second transmission unit according to an embodiment of the present invention.

As shown in FIG. 4, the second transmission unit 25 includes a low reverse hub 31, a plurality of friction plates 32, a plurality of friction members 33, a plurality of separator plates 34, a piston 35, a return spring 36, a hydraulic passage 37, a hydraulic chamber 38, and a seal member 39.

The low reverse hub 31 is fitted to the second rotating element RM2 in the second transmission unit 25, and rotates along with the second rotating element RM2 around the rotational shaft of the second rotating element RM2 in parallel with the X-axis direction (right and left direction in the figure) . Each friction plate 32 is constituted by an annular metal plate and attached to the outer peripheral surface of the low reverse hub 31. Each friction plate 32 rotates around the second rotating element RM2 along with the low reverse hub 31. The friction plate 32 is attached to allow slight displacement in the X-axis direction. The friction member 33 is attached on both end surfaces of each friction plate 32.

Each separator plate 34 is constituted by an annular metal plate and attached to the inner peripheral surface of the case 28. Each separator plate 34 is attached in the way to prevent rotation within the case 28 but that will allow displacement in the X-axis direction. The friction plate 32, to which the friction member 33 is attached, and the separator plate 34 constitute the clutch plate of the present invention.

A plurality of friction plates 32, each has the friction member 33 on both end surfaces, and a plurality of separator plates 34 are arranged interchangeably in the X-axis direction and formed a friction plate layer. There exist working oil between the friction member 33 and the separator plate 34.

The piston 35 engages with the separator plate 34 that is provided nearest to the hydraulic chamber 38. The piston 35 is displaced in the X-axis direction in accordance with the hydraulic pressure taken from the hydraulic chamber 38 and the urging force of the return spring 36.

The return spring 36 is arranged between the low reverse hub 31 and the piston 35, and generates the urging force along the X-axis direction. That is, the return spring 36 generates the urging force to disengage the second brake B2, and relaxes the pressing force of the X1 direction, which the friction plate layer takes from the piston 35, and generates a clearance (hereinafter, called as "pack clearance of the second brake B2") between the friction member 33 and the separator plate 34.

The hydraulic passage 37 transmits the hydraulic pressure adjusted by the linear solenoid valve SL4 to the hydraulic chamber 38. Hydraulic pressure in the hydraulic chamber 38 is directly controlled by the linear solenoid valve SL4 through the hydraulic passage 37. Hydraulic pressure in the hydraulic chamber 38 may be indirectly controlled by the linear solenoid valve SL4 through the brake control valve. The seal member 39 is arranged between the outer peripheral surface of the piston 35 and the inner peripheral surface of the case 28, and prevents leaks in the hydraulic chamber 38 while allowing displacement of the piston 35 in the X-axis direction.

In the second brake B2, hydraulic pressure supplied from the linear solenoid valve SL4 through the hydraulic passage 37 to the hydraulic chamber 38 is controlled to displace the piston 35, and to control the amount of pack clearance (hereinafter, referred to as "pack clearance amount") between the friction member 33 and the separator plate 34 in accordance with a displacement amount of the piston 35.

As shown in FIG. 1, the engine ECU 6 has a CPU (Central Processing Unit), a RAM (Random Access Memory), a ROM (Read Only Memory), an input interface, and an output interface, (which are not shown). The rotational speed of the engine 2 is controlled by the CPU based on signals input from the throttle sensor 9 and an accelerator operation amount sensor 13, a map stored in the ROM, or the like.

The transmission ECU 7 has the CPU, the RAM, the ROM, the input interface, and the output interface (which are not shown). The transmission ECU 7 changes the operating state of the linear solenoid valves SL1 to SL5 to selectively engage or disengage plural combinations of friction engagement elements of the transmission mechanism 4 by means of working pressure derived from line pressure PL. Based on a combination of engagement and disengagement of these friction engagement elements, a rotational speed ratio of the input shaft to the output shaft in the transmission mechanism 4 is changed to establish a gear step.

The RAM of the transmission ECU 7 stores the information, which indicates whether a second brake flag is on to determine whether the second brake B2 is engaged. The transmission ECU 7 turns on the second brake flag when the command to engage the second brake B2 is output to the linear solenoid valve SL4 in accordance with the second brake B2, and turns off the second brake flag when the command to disengage the second brake B2 is output to the linear solenoid valve SL4.

A map in which a vehicle speed and a throttle opening are associated with a gear step of the transmission mechanism 4 is stored in the ROM of the transmission ECU 7. Therefore, the transmission ECU 7 determines a gear step of the transmission mechanism 4 by the CPU, based on signals input from the vehicle speed sensor 10 and the throttle sensor 9 and the map stored in the ROM.

Furthermore, the ROM of the transmission ECU 7 stores: a friction amount estimation map in which the time lag of gear change of the automatic transmission 8 is associated with a friction amount of the friction member 33, and the pack clearance amount estimation map in which the time lag of gear change of the automatic transmission 8 is associated with a pack clearance amount of the second brake B2. Here, the time lag of gear change of the automatic transmission 8 indicates the duration, from the time when the transmission ECU 7 outputs a gear-change-command to the linear solenoid valves SL1 to SL5, to the time when the turbine rotational speed NT is reduced to a predetermined rotational speed. That is, the time lag of a gear change may be understood as a required time span from gear-change-start to gear-change-finish (gear change duration).

As described later, the transmission ECU 7 constitutes the control device of the automatic transmission, the rotational speed difference detection means, and hydraulic pressure control means, according to the present embodiment.

The vehicle 1 further includes the throttle sensor 9, the vehicle speed sensor 10, a turbine rotational speed sensor 11, an operating position sensor 12, the accelerator operation amount sensor 13.

The throttle sensor 9 is constituted by a hall element that obtains the output voltage proportional to the throttle opening of the throttle valve 14, for example. The throttle sensor 9 outputs the output voltage as a signal that indicates a throttle opening of the throttle valve 14 to the engine ECU 6 and the transmission ECU 7.

The vehicle speed sensor 10 detects the rotational speed of the output shaft of the transmission mechanism 4 (hereinafter referred to as "output shaft rotational speed"), and outputs a signal that indicates the detected output shaft rotational speed to the engine ECU 6 and the transmission ECU 7. The engine ECU 6 and the transmission ECU 7 calculate the vehicle speed based on this signal.

The turbine rotational speed sensor 11 detects the rotational speed of the input shaft 26 (hereinafter referred to as "turbine rotational speed"), and outputs a signal that indicates the detected turbine rotational speed to the transmission ECU.

The shift lever position sensor 12 detects the position of a shift lever 15, and transmits a signal that indicates the detected position to the transmission ECU 7. The transmission ECU 7 forms an optimum gear step of the transmission mechanism 4 in the range corresponding to the position of the shift lever 15. The operating position sensor 12 may be constituted to detect that the shift lever 15 is positioned at a manual position where the driver may choose any gear step, in response to the operation of the driver.

The accelerator operation amount sensor 13 is constituted by an electronic position sensor using a hall element, for example. When the accelerator pedal 16 provided in the vehicle 1 is operated by the driver, a signal that indicates the an accelerator operation amount, as indicated by the position of the accelerator pedal 16, is output to the engine ECU 6.

Hereinafter, the characteristic constitution of the transmission ECU 7 according to the embodiment of the present invention will be described.

The transmission ECU 7 calculates the vehicle speed based on the output shaft rotational speed detected by the vehicle speed sensor 10. Based on the detected vehicle speed and the current gear step, the transmission ECU 7 calculates the differential rotation, which is the difference in rotational speed between the friction member 33 of the friction plate 32 and the separator plate 34 when the second brake B2 is disengaged. That is, the transmission ECU 7 constitutes the rotational speed difference detection means of the present embodiment.

Depending on the calculated differential rotation, the transmission ECU 7 controls the working pressure of the piston 35 to adjust the pack clearance of the second brake B2 when the second brake B2 is disengaged. The transmission ECU 7 reduces the pack clearance of the second brake B2 if the differential rotation when the second brake B2 is disengaged equals or exceeds a predetermined value a. That is, the transmission ECU 7 constitutes the hydraulic pressure control means of the present embodiment.

The transmission ECU 7 corrects the pack clearance of the second brake B2 when the second brake B2 is disengaged, based on the gear change state of the automatic transmission 8 when the second brake B2 is being engaged, in other words, based on the time lag of gear change.

Figure 5:
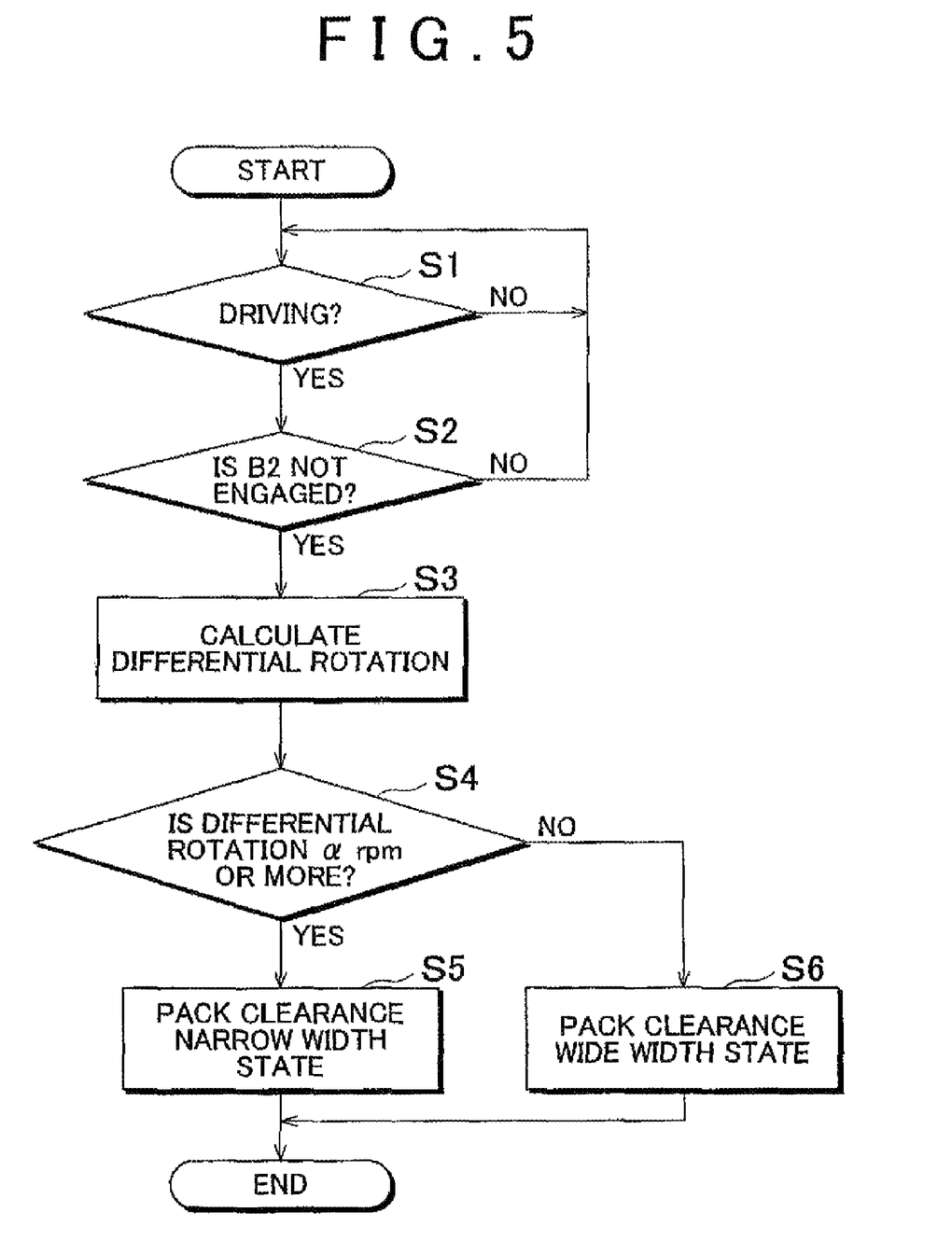
FIG. 5 is a flowchart illustrating operation of a transmission ECU according to an embodiment of the present invention.

Operation is next describe FIG. 5 is a flowchart illustrating the operation of the transmission ECU according to an embodiment of the present invention. Processes described below may be implemented by the program stored in the ROM of the transmission ECU 7.

As shown in FIG. 5, at first, the transmission ECU 7 determines whether the vehicle 1 is driving (step S1). For example, the transmission ECU 7 calculates the vehicle speed based on the output shaft rotational speed detected by the vehicle speed sensor 10, and determines whether the calculated vehicle speed is more than 0, and accordingly determines whether the vehicle 1 is in motion. Here, if it is determined that the vehicle is not in motion (in the case of NO in step S1), the transmission ECU 7 executes the process of step S1 again.

On the other hand, if it is determined that the vehicle 1 is driving (in the case of YES in step S1), the transmission ECU 7 determines whether the second brake B2 is engaged (step S2). For example, the transmission ECU 7 determines whether the second brake B2 is engaged by acquiring the information, which represents on or off of the second brake flag, from the RAM of the transmission ECU 7. Here, if it is determined that the second brake B2 is engaged (in the case of NO in step S2), the process returns to step S1.

Conversely, if it is determined that the second brake B2 is not engaged (in the case of YES in step S2), the transmission ECU 7 calculates a vehicle speed based on the output shaft rotational speed detected by the vehicle speed sensor 10, and calculates the differential rotation, which represents the rotational speed difference between the friction plate 32 and the separator plate 34 based on a detected vehicle speed and a current gear step (step S3). That is, the transmission ECU 7 calculates the rotational speed difference between the friction plate 32 and the separator plate 34 when the second brake B2 is disengaged. The transmission ECU 7 acquires the current gear step based on the output shaft rotational speed detected by the vehicle speed sensor 10 and the turbine rotational speed detected by the turbine rotational speed sensor 11. Next, the transmission ECU 7 determines whether the calculated differential rotation equal or above the predetermined value a [rpm] (step S4).

Here, if the calculated differential rotation is equal to or above the predetermined value a (in the case of YES in step S4), that is, if the vehicle 1 is driven at high speed, the transmission ECU 7 narrows the pack clearance of the second brake B2 (step S5), by controlling the working pressure of the piston 35, in order to prevent the friction member 33 from moving intensely and coming into contact with the separator plate 34, and then the transmission ECU 7 ends the process. Here, the pack clearance is narrowed to a distance of PC1. For example, the transmission ECU 7 outputs the control signal CTL1 to the linear solenoid SL4 so that the piston 35 is pressed by the hydraulic pressure P1 in accordance with the pack clearance amount PC1. When the control signal CTL1 is received, the linear solenoid SL4 adjusts the line pressure PL so that hydraulic pressure in the hydraulic chamber 38 becomes P1.

On the other hand, if it is determined that the differential rotation is below the predetermined value a (in the case of NO in step S4), that is, if the vehicle 1 is driven at normal speeds, the transmission ECU 7 widens the pack clearance of the second brake B2 by controlling the working pressure of the piston 35 (step S6) to reduce the drag torque generated between the friction member 33 of the friction plate 32 and the separator plate 34, and then the transmission ECU 7 ends the process. Here, the pack clearance is widened to a distance of PC2 (PC2>PC1). For example, the transmission ECU 7 outputs the control signal CTL2 to the linear solenoid SL4 so that the piston 35 is pressed by the hydraulic pressure P2 to yield the pack clearance amount PC2. When the control signal CTL2 is received by the linear solenoid SL4, the linear solenoid SL4 adjusts the line pressure PL so that hydraulic pressure in the hydraulic chamber 38 becomes P2. If the rotational speed difference in a disengagement state is large when the second brake is disengaged, the transmission ECU 7 may narrow the clearance between the clutch plates, in comparison to when the rotational speed difference is small.

Figure 6:
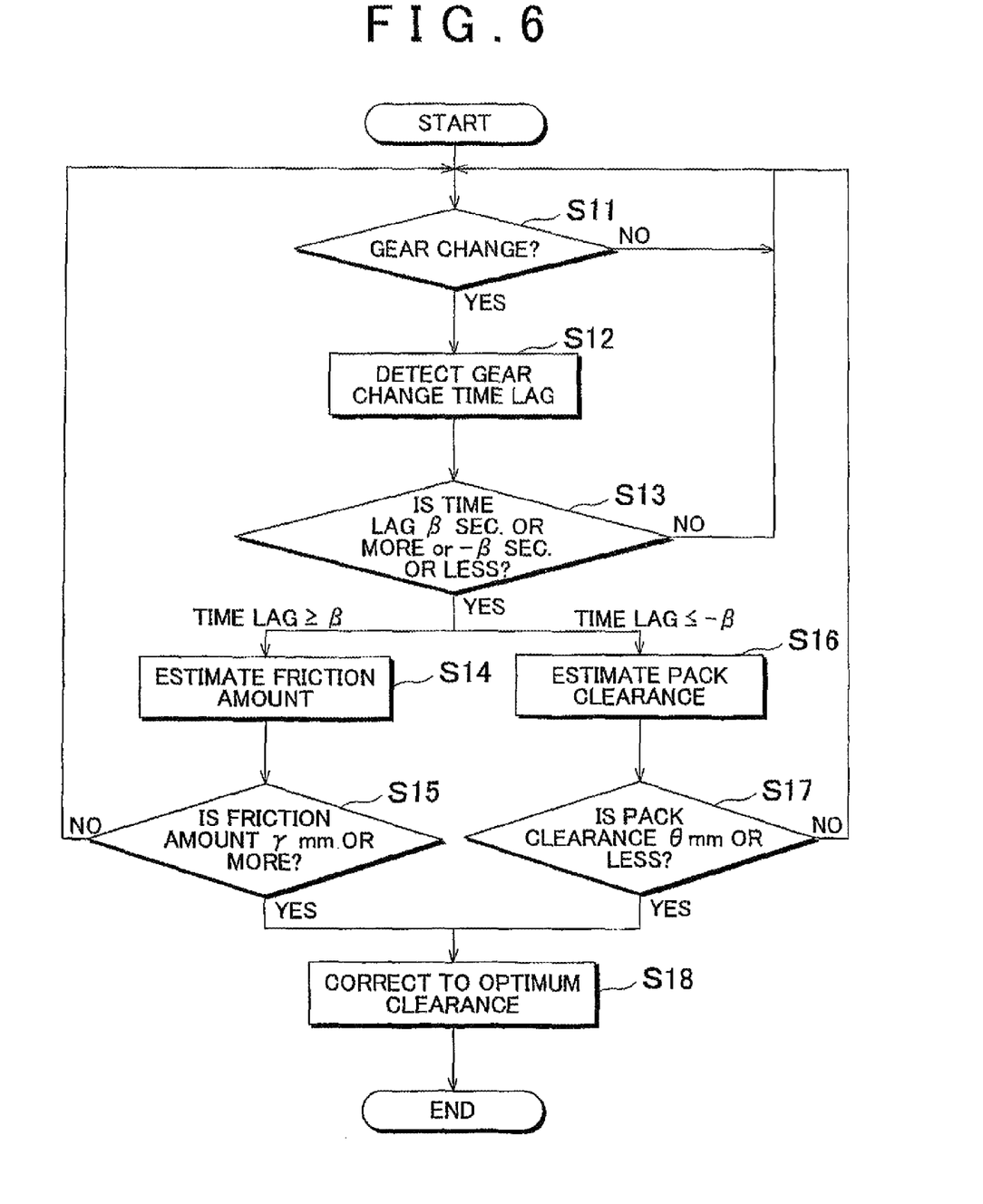
FIG. 6 is a flowchart illustrating learning processes of a pack clearance according to an embodiment of the present invention.

FIG. 6 is a flowchart illustrating a process of learning the pack clearance according to an embodiment of the present invention. Processes described below may be implemented by the program stored in the ROM of the transmission ECU 7.

As shown in FIG. 6, the transmission ECU 7 determines whether the automatic transmission 8 has completed the gear change (step S11). For example, the transmission ECU 7, after outputting a gear-change-command signal for the linear solenoid valves SL1 to SL5 to change a gear of the automatic transmission 8, determines whether the automatic transmission has completed the gear change, by determining a state shift, which is the shift from a state where the difference between the output shaft rotational speed, detected by the vehicle speed sensor 10 and multiplied by a predetermined gear ratio, and the turbine rotational speed detected by the turbine rotational sensor 11 is equal to or above a predetermined value to a state where the difference between the output shaft rotational speed multiplied by a predetermined gear ratio and the turbine rotational speed is equal to or below a predetermined value. In the present embodiment, the pack clearance of the second brake B2 may be learned, therefore, a gear change here indicates the gear change that involves an engagement of the second brake B2.

Here, if it is determined that the automatic transmission 8 has not completed the gear shift (in the case of NO in step S11), the transmission ECU 7 executes the process of step S11 again.

However, if it is determined that the automatic transmission 8 has completed the gear shift (in the case of YES in step S11), the transmission ECU 7 detects the time lag of gear change. For example, the transmission ECU 7 starts a timer when a gear-change-commanding signal is output to the linear solenoid valves SL1 to SL5, and the transmission ECU 7 detects the time lag of gear change by reading out a counted value of the timer when the turbine rotational speed is reduced to a predetermined rotational speed.

Next, the transmission ECU 7 determines whether the time lag of gear change is equal to or above the predetermined value $\beta$ (second) or is equal to or below the predetermined value $-\beta$ (second) (in the case of NO in step S13). If the time lag of the gear change is above $-\beta$ and below $\beta$ (in the case of NO in step S13), the process returns to the step S11.

However, if the time lag of the gear change is equal to or above the predetermined value $\beta$ (in the case of YES in step S13), the transmission ECU 7 refers to a friction amount estimation map stored in the ROM of the transmission ECU 7, and estimates the friction amount of the friction member 33 based on a time lag of gear change.

Next, the transmission ECU 7 determines whether the friction amount is equal to or above the predetermined value $\gamma$ [mm] (step S15). Here, if the friction amount is equal to or above the predetermined value $\gamma$ (in the case of YES in step S15), the transmission ECU 7 moves the process to step S18. If the friction amount is below the predetermined value $\gamma$ (in the case of NO in step S15), the transmission ECU 7 moves the process back to step S11.

If the time lag of gear change is equal to or below the predetermined value $-\beta$ (in the case of YES in step S13), the transmission ECU 7 refers to a pack clearance amount estimation map stored in the ROM of the transmission ECU 7, and estimates the pack clearance amount based on the time lag of gear change (step S16).

Next, the transmission ECU 7 determines whether the pack clearance amount is equal to or below the predetermined value θ [mm] (step S17). Here, if the pack clearance amount is equal to or below the predetermined value θ (in the case of YES in step S17), the transmission ECU 7 moves the process to step S18. If the pack clearance amount is equal to or above the predetermined value θ (in the case of NO in step S17), the transmission ECU 7 moves the process back to step S11.

The transmission ECU 7 corrects the pack clearance of the second brake B2 to the optimum width (step S18). For example, if the friction amount of the friction member 33 is equal to or above as γ, the transmission ECU 7 sets a new pack clearance amount PC1 by subtracting a predetermined value from the pack clearance amount PC1, and sets a new pack clearance amount PC2 by subtracting a predetermined value from the pack clearance amount PC2. That is, the transmission ECU 7 reduces a pack clearance amount in a narrow width state and a wide width state, and to prevent the time lag of the gear change duration from increasing due to the friction of the friction member. The transmission ECU 7 may make correction to reduce the clearance between disengaged clutch plates if the time lag of the gear change (gear change duration) is equal to or above the first predetermined duration.

If it is determined that the pack clearance amount equals or is below the predetermined amount θ, the transmission ECU 7 sets a new pack clearance amount PC1 by adding a predetermined amount to the pack clearance amount PC1, and sets a new pack clearance amount PC2 by adding a predetermined amount to the pack clearance amount PC2. That is, the transmission ECU 7 may widen the pack clearance amount in a narrow width state and in a wide width state, and prevents the state in which a pack clearance becomes too small. If a time lag of gear change (the gear change duration) is equal to or less than the second predetermined duration, the transmission ECU 7 may make correction to reduce the clearance between the clutches when disengaged.

As described above, by using the transmission ECU 7 according to the present embodiment, the clearance of the second brake B2 when disengaged may be adjusted in accordance with the differential rotation between the friction plate 32 and the separator plate 34. Accordingly, the drag torque that is generated between the friction member 33 of the friction plate 32 and the separator plate 34 is reduced not only when the vehicle 1 is driven at high speed, but also when the vehicle 1 is driven at normal speed. As a result, the durability of the automatic transmission as well as the fuel economy of the vehicle 1 are improved.

The second brake B2 is idle in a normal-speed driving range and in a high-speed driving range (when the vehicle is traveling at either normal speed or high speed). Therefore, drag torque generated between the friction member 33 of the friction plate 32 and the separator plate 34 greatly affects to the power performance. The transmission ECU 7 according to the present embodiment is very useful because drag torque generated between the friction member 33 of the friction plate 32 and the separator plate 34 in the second brake B2 is reduced.

The transmission ECU 7 according to the present invention reduces the intense motion of the friction plate 32 when the vehicle 1 is driven in a high-speed driving range. Thus, the drag torque generated between the friction member 33 of the friction plate 32 and the separator plate 34 may be reduced. As a result, durability of the automatic transmission 8 is improved, and at the same time, the fuel economy of the vehicle 1 is also improved.

The transmission ECU 7 according to the present embodiment corrects the clearance of the second brake B2 when disengaged, based on the time lag when changing gears in the automatic transmission 8. Thus, overtime change of each part such as the friction member 33 is less caused, and the optimum clearance can be maintained.

The transmission ECU 7 according to the present embodiment calculates the differential rotation, which is the difference in rotational speed between the friction plate 32 and the separator plate 34 when disengaged, based on the vehicle speed and the current gear step. Therefore, the differential rotation may be precisely calculated.

In the present embodiment, the pack clearance is generated between the friction member 33 and the separator plate 34 by the application force of the return spring 36. However, the pack clearance may be generated between the friction member 33 and the separator 34 by a first return spring and a second return spring that is shorter than the first return spring.

Specifically, the first return spring is used when the pack clearance is widened, and the second return spring is used when the pack clearance is narrowed. The second return spring controls the distance between the low reverse hub 31 and the piston 35 where the pack clearance amount is PC1. If the hydraulic pressure is controlled to a predetermined low-pressure level, the distance between the low reverse hub 31 and the piston 35 is substantially equal to the length of the second return spring. If the hydraulic pressure is controlled to be 0, the piston 35 moves back to the far end of the X2 direction.

Accordingly, a stable pack clearance that is not affected by variations of hydraulic pressure or the like can be generated. Thus, burn-in of the friction member 33 may be prevented.

In the present embodiment, the clearance between the friction member 33 of the friction plate 32 and the separator plate 34 is set as a clearance between the clutch plates in the present invention. However, a clearance between the separator plates 34 or a clearance between the friction plates 32 may be set as the clearance between the clutch plates in the present invention.

In this case, the transmission ECU 7 adjusts the clearance between the separator plates 34 or the clearance between the friction plates 32 in accordance with the differential rotation, which represents the rotational speed difference between the friction plate 32 and the separator plate 34.

In the present embodiment, the transmission ECU 7 adjusts the clearance between the friction member 33 of the friction plate 32 and the separator plate 34 in the second brake B2. However, the transmission ECU 7 may instead adjust the clearance between the friction member of the friction plate and the separator plate of a friction engagement element other than the second brake B2.

In this embodiment, the transmission ECU 7 adjusts the pack clearance of the second brake B2 to a narrow width state or a wide width state in accordance with the differential rotation, which represents the rotational speed difference between the friction plate 32 and the separator plate 34. However, the pack clearance of the second brake B2 may be a pack clearance amount in accordance with the differential rotation.

In this case, for example, the pack clearance amount map, in which the differential rotation and a pack clearance amount are corresponded, is stored in the ROM of the transmission ECU 7. The transmission ECU 7 refers to the pack clearance amount map, and determines the appropriate pack clearance amount based on the differential rotation, and decides a pack clearance of the second brake B2.

In this embodiment, the transmission ECU 7 adjusts the pack clearance of the second brake B2 in the transmission mechanism 4 shown in FIG. 2. However, the transmission ECU 7 in the present embodiment may instead adjust the pack clearance of the second brake B2 in the transmission mechanism in the manner described below.

Figure 7:
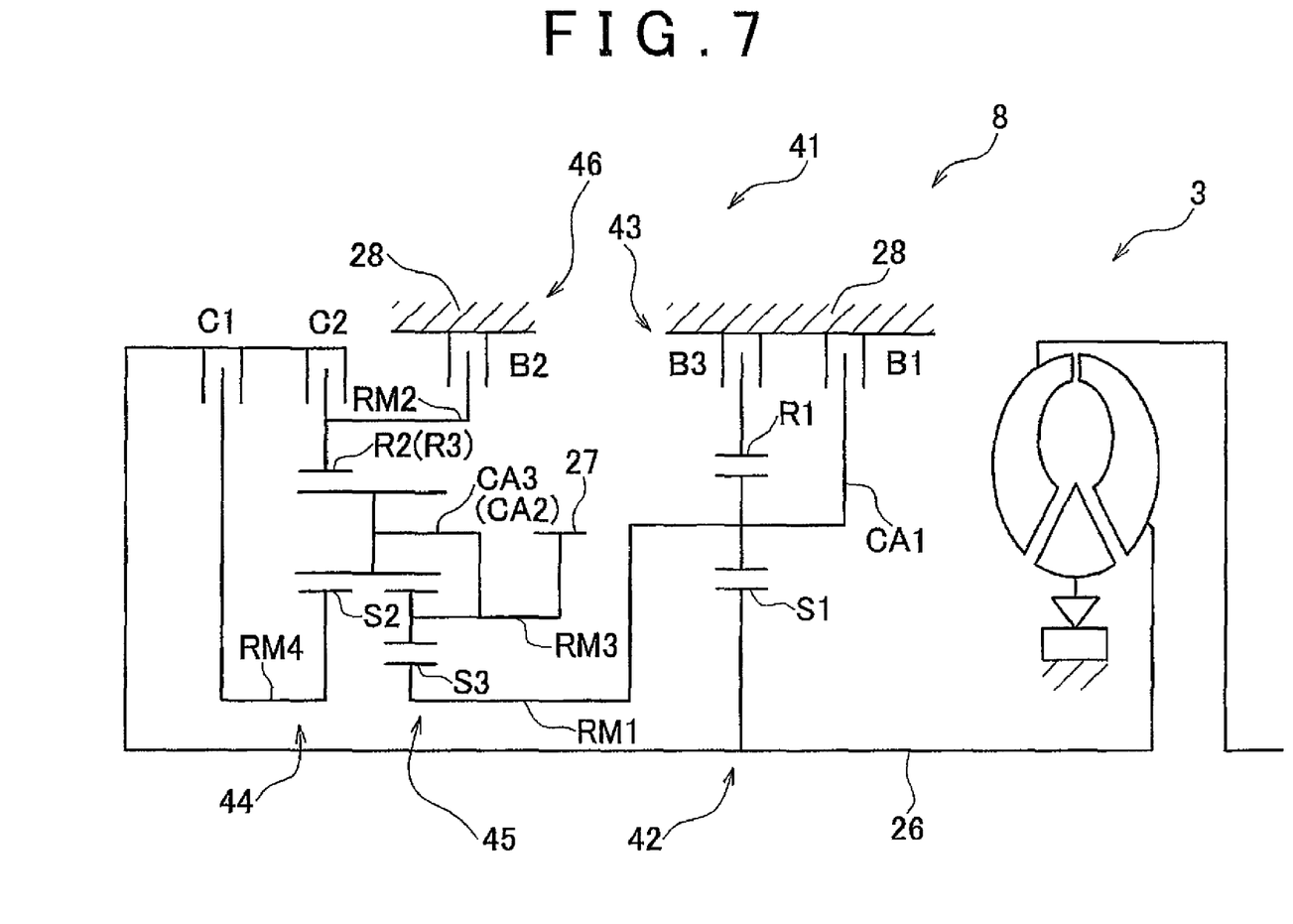
FIG. 7 is a schematic diagram illustrating an automatic transmission according to another embodiment of the present invention.

FIG. 7 is a schematic diagram illustrating an automatic transmission according to another embodiment of the present invention. Hereinafter, the components that are shared with the automatic transmission shown in FIG. 2 are denoted by the same reference numerals.

As shown in FIG. 7, the transmission mechanism 41 of the automatic transmission 8 has: the first transmission unit 43 that mainly includes the single pinion type of planetary gear train 42; and the second transmission unit 46 that mainly including the single pinion type of second planetary gear train 44 and the double pinion type of third planetary gear train 45; on the same shaft line. By this constitution, the rotational speed of the input shaft 26 is changed and output from the output gear 27. The input shaft 26 is the turbine shaft of the torque converter 3 that rotated by the engine 2. The output gear 27 rotates the right and left driving wheels through the differential gear. The transmission mechanism 41 is generally symmetrical with respect to the centerline (input shaft line), and thus, the lower half of the transmission mechanism 41 is not shown in FIG. 7.

The first planetary gear train 42 includes three rotating elements, which are the sun gear S1, the carrier CA1, and the ring gear R1. In the first planetary gear unit 42, the sun gear S1 is connected to the input shaft 26 and driven to rotate. At the same time, the ring gear R1 is unrotatably fixed to the case 28 through the third brake B3, accordingly, the rotational speed of carrier CA1 is reduced relative to the rotational speed of the input shaft 26.

The second planetary gear train 44 and the third planetary gear train 45, which constitute the second transmission unit 46, are partly connected to each other so as to constitute four rotating elements RM1 to RM4. Specifically, the first rotating element RM1 is constituted by the sun gear S3 of the third planetary gear train 45. The second rotating element RM2 is constituted by the ring gear R2 of the second planetary gear train 44 and the ring gear R3 of the third planetary gear train 45, which are connected to each other. The third rotating element RM3 is constituted by the carrier CA2 of the second planetary gear train 44 and the carrier CA3 of the third planetary gear train 45, which are connected to each other. The fourth rotating element RM4 is constituted by the sun gear S2 of the second planetary gear train 44.

In the second planetary gear train 44 and the third planetary gear train 45, the carriers CA2 and CA3 are constituted by a common member, and the ring gears R2 and R3 are constituted by a common member. The pinion gear of the second planetary gear train 44 is a Ravigneaux type of planetary gear line that also serves as the second pinion gear of the third planetary gear train 45.

Rotation of the first rotating element RM1 (sun gear S3) is selectively connected to the case 28 and stopped by the first brake B1, and rotation of the second rotating element RM2 (ring gears R2 and R3) is selectively connected to the case 28 and stopped by the second brake B2, and the fourth rotating element RM4 (sun gear S2) is selectively connected to the input shaft 26 via the first clutch C1, and the second rotating element RM2 (ring gears R2 and R3) is selectively connected to the input shaft 26 via the second clutch C2, and the first rotating element RM1 (sun gear S3) is integrally connected to the carrier CA1 of the first planetary gear train 42, and the third rotating element RM3 (carriers CA2 and CA3) is integrally connected to the output gear 27, and outputs rotation.

In this way, in the automatic transmission shown in FIG. 7, as with the automatic transmission shown in FIG. 2, the engagement of the second brake B2 is established only when engine braking is occurring while the first gear step is established. The second brake B2 in the automatic transmission shown in FIG. 7 runs idle in a normal-speed driving range and in a high-speed driving range (when the vehicle is driven at both normal and high speeds), for example. Therefore, drag torque generated between the friction member of the friction plate and the separator plate greatly affects to the power performance in the respective driving ranges. Thus, it is very useful because the drag torque generated between the friction member of the friction member plate in the second brake B2 and the separator plate can be reduced by applying the transmission ECU 7 according to the present embodiment to the automatic transmission shown in FIG. 7 and adjusting a pack clearance of the second brake B2.

As described above, the present invention improves the durability of the automatic transmission as well as the fuel economy of the vehicle by decreasing the drag torque of the clutch plate, regardless of whether the vehicle drives in a high-speed driving range or in a normal-speed driving range. The present invention is useful for the control device of an automatic transmission that optimally adjusts a clearance between friction engagement elements when the friction engagement elements are not engaged.

What is claimed is:

1. A control device for an automatic transmission including plural pairs of friction engagement elements constituted by multiple-plate clutch plates, which switches each of the friction engagement elements between an engagement state and a disengagement state by controlling a piston that actuates the clutch plates to form a plurality of gear steps, the control device comprising:
    a rotational speed difference detection device that detects a relative rotational speed difference between the clutch plates in the disengagement state; and
    a hydraulic pressure control device that controls working pressure of the piston such that the larger the rotational speed difference detected by the rotational speed difference detection device is, the smaller a clearance between the clutch plates in the disengagement state is.

2. The control device according to claim 1, wherein the hydraulic pressure control device makes the clearance between the clutch plates smaller when the rotational speed difference in the disengagement state is large than when the rotational speed difference is small.

3. The control device according to claim 1, wherein the hydraulic pressure control device corrects the clearance between the clutch plates in the disengagement state based on a gear change state of the automatic transmission when the friction engagement elements is switched from the disengagement state to the engagement state.

4. The control device according to claim 1, wherein the rotational speed difference detection device detects the relative rotational speed difference between clutch plates in the disengagement state based on a vehicle speed and a gear step.

5. A control device for an automatic transmission, including plural pairs of friction engagement elements constituted by multiple-plate clutch plates, which switches each of the friction engagement elements between an engagement state and a disengagement state by controlling a piston that actuates the clutch plates to form a plurality of gear steps, comprising:

a rotational speed difference detection device that detects a relative rotational speed difference between the clutch plates in the disengagement state; and a hydraulic pressure control device that controls working pressure of the piston to adjust a clearance between the clutch plates in the disengagement state in accordance with the rotational speed difference detected by the rotational speed difference detection device, wherein the hydraulic pressure control device makes the clearance between the clutch plates smaller when the rotational speed difference in the disengagement state is large than when the rotational speed difference is small.

6. The control device according to claim 5, wherein the hydraulic pressure control device corrects the clearance between the clutch plates in the disengagement state based on a gear change state of the automatic transmission when the friction engagement element is switched from the disengagement state to the engagement state.

7. The control device according to claim 5, wherein the rotational speed difference detection device detects the relative rotational speed difference between the clutch plates in the disengagement state based on a vehicle speed and a gear step.

* * * * *